United States Patent [19]

Lynch

[11] 3,983,987
[45] Oct. 5, 1976

[54] ARTICLE COUNTING AND STACKING APPARATUS
[75] Inventor: Joseph A. Lynch, Westwood, N.J.
[73] Assignee: Nabisco, Inc., East Hanover, N.J.
[22] Filed: May 19, 1975
[21] Appl. No.: 578,654

[52] U.S. Cl. .............................. 198/480; 198/525; 198/689
[51] Int. Cl.² .................................. B65G 57/00
[58] Field of Search ................ 198/25, 26, 32, 34, 198/35, 82, 103, 209–212; 214/6 R, 6 F, 6 FS, 6 M; 221/277

[56] References Cited
UNITED STATES PATENTS

| | | | |
|---|---|---|---|
| 2,744,608 | 5/1956 | Ardell et al. | 198/34 |
| 3,013,693 | 12/1961 | Griner | 198/26 |
| 3,039,588 | 6/1962 | Harnack | 221/277 |
| 3,104,752 | 9/1963 | Rudszinat et al. | 198/211 |
| 3,405,579 | 10/1968 | London | 198/32 |
| 3,603,445 | 9/1971 | Zausch et al. | 198/35 |
| 3,637,064 | 1/1972 | Guacho et al. | 198/32 |

Primary Examiner—Evon C. Blunk
Assistant Examiner—Joseph E. Valenza
Attorney, Agent, or Firm—Gerald Durstewitz; I. Allen Strombeck

[57] ABSTRACT

Articles are counted into groups and deposited on a conveyor by each of several assemblies arranged along the conveyor. The assemblies are positioned and synchronized so that each assembly deposits articles directly on top of the articles deposited by the previous assembly to form stacks of articles. Each assembly includes a pair of wheels having vacuum ports around their periphery to carry articles and a serrated pick off wheel of smaller diameter positioned between the vacuum wheels. The pick off wheel removes articles from the end of a delivery chute and positions them on the vacuum wheels. The serrations are discontinuous around the periphery of the pick off wheel to count off spaced groups of articles.

12 Claims, 3 Drawing Figures

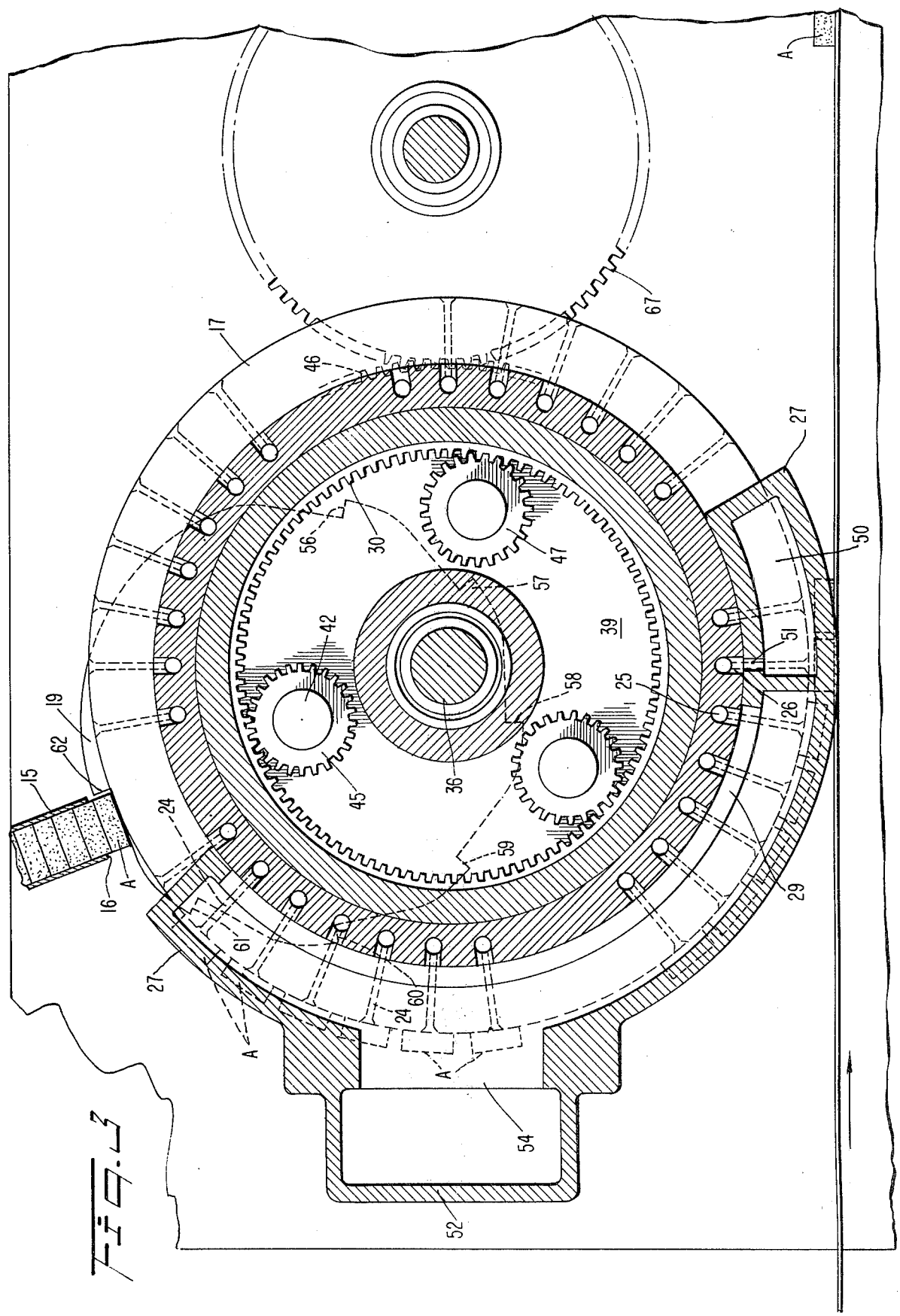

ARTICLE COUNTING AND STACKING APPARATUS

BACKGROUND OF THE INVENTION

The present invention relates to article handling apparatus, and, more particularly to such apparatus which is useful in the counting, grouping or stacking of articles and operates at a high rate of speed. In conventional arrangements the counting and stacking of baked articles such as cookies is accomplished by machinery relying heavily upon reciprocating elements for its operation. The articles are arranged in rows upon a conveyor, and reciprocating vacuum heads having vertical and horizontal motion pick up each row of articles and stack them on a stepping conveyor. The speed of operation of such machinery is limited by the reciprocation motion of the vacuum heads.

It is therefore an object of the present invention to provide improved article handling apparatus capable of operating at high rates of speed.

Another object is to provide such apparatus in which all essential elements are in continuous motion.

Another object is to provide such apparatus which is useful in the counting a stacking of articles.

Another object is to provide improved high speed article counting and stacking apparatus.

The foregoing objects are accomplished by providing article handling apparatus comprising in combination means for delivering a column of articles, a wheel for transporting articles having means for holding articles thereto, a pick off wheel of smaller diameter than the transporting wheel for removing articles from the delivery means and depositing them on the transporting wheel, means for rotating the wheels in the same direction, the pick off wheel being positioned with its axis of rotation between the end of the delivery means and the axis of rotation of the transporting wheel.

BRIEF DESCRIPTION OF THE DRAWING

A preferred embodiment of the invention has been chosen for purposes of illustration and description, and is shown in the accompanying drawings forming a part of the specification, wherein:

FIG. 3 is a sectional view taken along line 3—3 on FIG. 2.

DESCRIPTION OF THE PREFERRED EMBODIMENT

Figure 1:
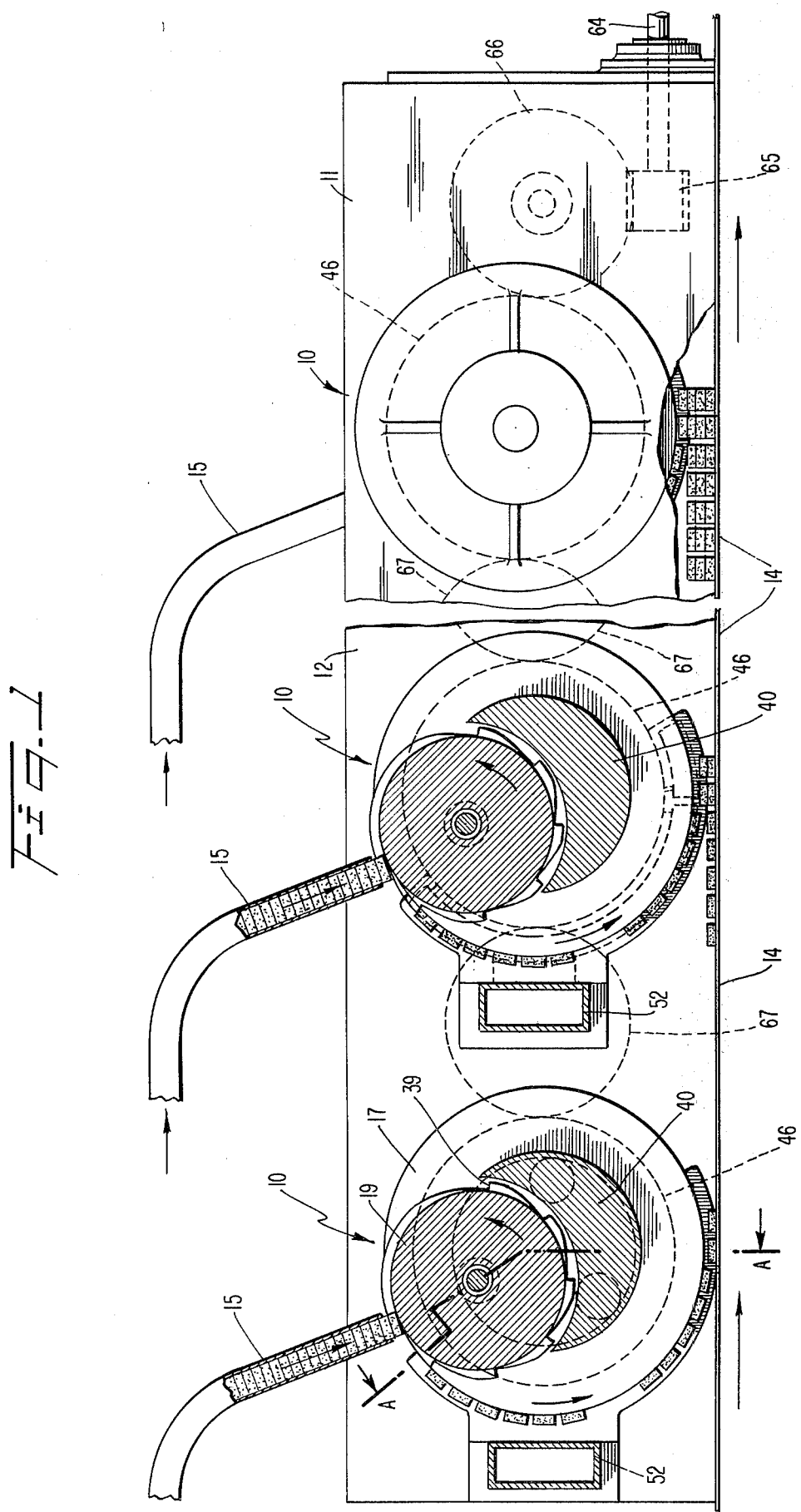
FIG. 1 is a elevational view partly in longitudinal section of an article counting and stacking apparatus according to the present invention.

Referring to the drawings in detail, there is shown article counting and stacking apparatus according to the present invention which includes a plurality of article handling assemblies 10 mounted between a front frameplate 11 and a rear frameplate 12 above a conveyor 14.

Each of the assemblies 10 include an article delivery chute 15 having an open end 16, a front vacuum wheel 17, a rear vacuum wheel 18, and a pick off wheel 19 positioned between the wheels 17 and 18. Article A are removed from the chute by the pick off wheel and placed upon the outer edge of the vacuum wheels which transport them to the conveyor. The vacuum wheels 17 and 18 are annular, each having an outer edge portion 20 and a flange portion 21. The edge portion 20 is provided with vacuum ports 22 which are connected with a vacuum source through radial passageways 24 in the edge portion and axially extending passageways 25 in the flange portion 21. Ports 26 formed in the outer edge of the flange portion 21 connect the passageways 25 to a stationary manifold 25 through a slot 29 in the manifold inner wall. A ring gear 30 rigidly is mounted to the flange portion of 21 of each wheel 17 and 18. The wheels 17 and 18 are mounted to tubular shafts 31 and 32 respectively by annular plates 33. The shafts 31 and 32 are journalled in bearing formations 34 and 35 mounted to the frame plates 11 and 12 respectively.

The pick off wheel 19 is supported by stationary shafts 36 and 37 which are mounted on bearings within the tubular shafts 31 and 32 respectively. A circular plate 39 is mounted on the inner end of each of the shaft 36 and 37 and the two plates are joined by a cresent shaped block 40 (FIG. 1). The pick off wheel is mounted to the plates 39 by means of shafts 41 and 42 which extend from each side of the wheel 19 through bearings 44 mounted in the plates 39. A gear 45 is rigidly mounted on the end of each of the shafts 41 and 42 to mesh with the ring gears 30. The shafts 41 and 42 are rigidly connected to the wheel 19 so that rotation of one gear 45 causes the wheel 19 and the other gear 45 to rotate. Two pair of freely rotatable idler gears 47 are mounted to the plates 39 for balancing the ring gears.

The tubular shaft 32 extends past the bearing formation 35 and gear 46 is keyed to the end thereof to rotate the vacuum wheels 17 and 18. The bearing formation 34 is provided with an end cap 48 formed with a cup portion 49 for receiving the end of the shaft 36. The shaft 36 is keyed to the cup 49 to hold the shafts 36 and 37 against rotation.

The vacuum manifolds 27 extend from adjacent the delivery chute 15 around the wheels 17 & 18 to the conveyor 14 in the direction of rotation (counter clockwise) of the vacuum wheels. At the lower end of each of the vacuum manifolds there is provided a high pressure chamber 50 having an outlet port 51 which communicates with each of the ports 26 in turn as the wheels rotate. The vacuum manifolds 27 are connected to a vacuum conduit 52 through a slot 54 shown in FIG. 3. The pressurized chamber 50 is connected to a pressure conduit (not shown).

Figure 2:
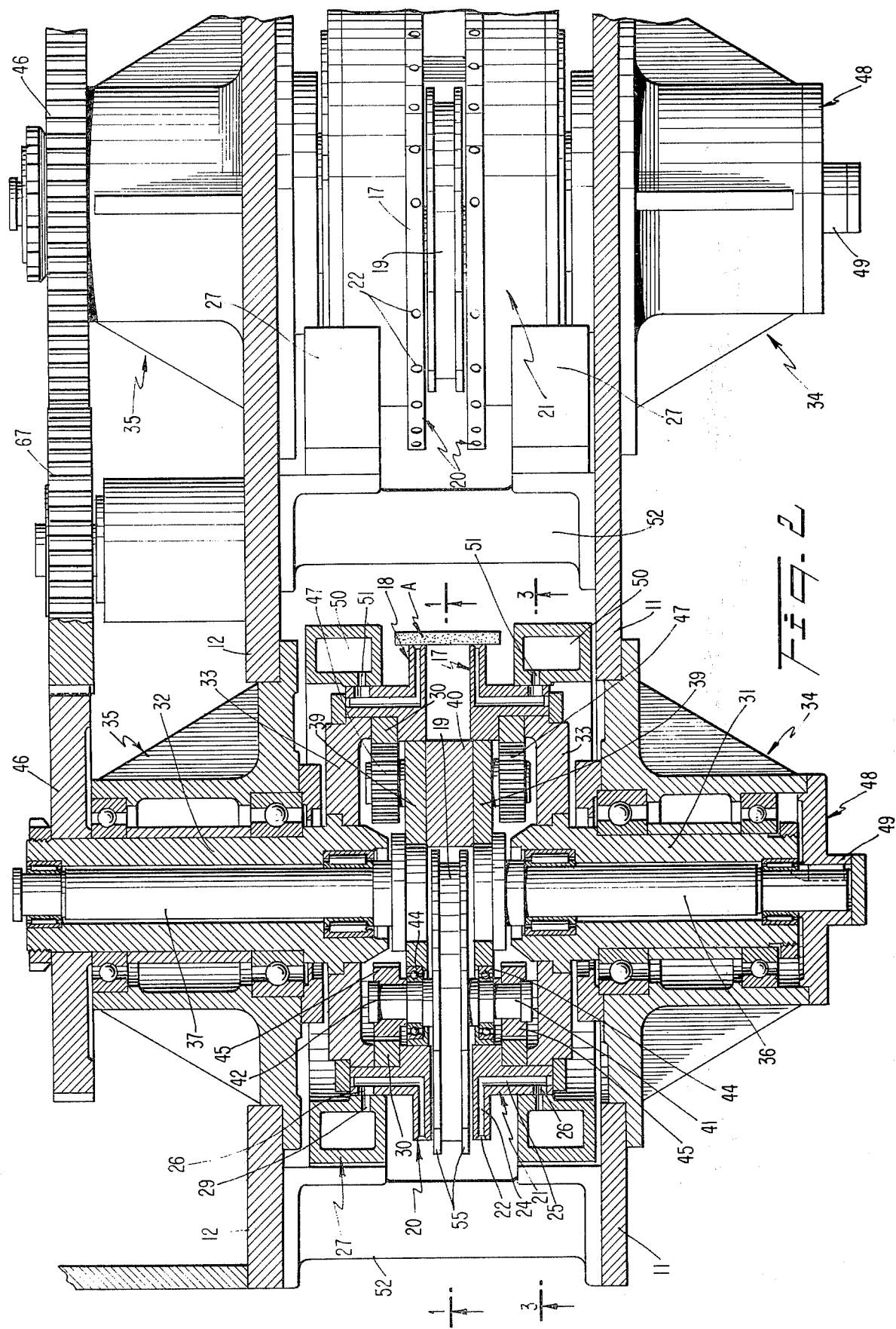
FIG. 2 is a top plan view of a portion of the apparatus of FIG. 1 in which the first article handling assembly is shown in a section taken along the line A—A.

A vacuum port 22 is provided in each vacuum wheel 17 and 18 for each article carrying position around the circumference of the vacuum wheels. The article carrying positions (and the ports 22) are arranged in groups spaced from each other. In the embodiment shown there are four groups with seven article positions in each group. The pick off wheel is constructed with a pair of edge flanges 55 (FIG. 2) in which are formed a tooth for each article position in one group on the vacuum wheels. In the particular embodiment shown there are seven teeth 56 to 62 is spaced an equal distance behind the preceeding tooth in the counter clockwise direction, while the tooth 56 is spaced from the tooth 62 by a considerably larger distance.

Power is supplied to the apparatus by a continuously driven shaft 64 which turns a worm gear 65 and drives a gear 66. The gear 66 drives the gear 46 of the last assembly 10 and power is delivered to each assembly through gears 67 positioned between adjacent gears 46. All the gears 46 are turned counter clockwise and drive the vacuum wheels 18 and their ring gears 30 in a counter clockwise direction. The ring gear on the wheels 18 drive the pick off wheels 19 in the counter clockwise direction. The pick off wheels 19 in turn drive the vacuum wheels 17 through the ring gears 30 carried by the wheels 19. The shafts 36 and 37 are locked in place by the key 49 to hold the pick off wheel at the mouth of the delivery chute 15.

The gears 30 and 45 are selected to have a ratio such that for each revolution of the vacuum wheels, the pick off wheel turns a number of times equal to the number of groups of article positions on the vacuum wheels. As each tooth of the pick off wheel moves past the open end of the delivery chute, it strips an article from the chute and moves it along the circumferential edges of the wheels 17 and 18 until the tooth moves below the edge. The article is at that point aligned with a port 22 in each of the wheels 17 and 18, the ports being connected to the vacuum manifold to hold the article to the wheels. In this manner, each of the teeth 56 to 62 position one article on the wheels 17, 18 to form a group of articles. The extra space between the last tooth 62 and the first tooth 56 is provided to accomodate the spacing between the groups of articles.

As each article reaches its lowest point over the conveyor, the vacuum is cut off and the article is positively separated from the wheels 17, 18 by a spurt of pressurized air which is directed from the chamber 50 into the ports 26 and through the passageways 25, 24 to the ports 22. Each group of articles is thus laid down in turn upon the conveyor 14. The verticle spacing of the assemblies 10 from the conveyor increases by a distance equal to one article thickness with each consecutive assembly to allow each assembly to place articles on top of the articles previously deposited. The vacuum wheels of consecutive assemblies are synchronized and their rotational speed is related to the speed of the conveyor 14 so that the articles deposited by each assembly is in exact registery with the articles laid down by the previous assemblies so as to form stacks of articles as shown in FIG. 1.

The present invention is useful for arranging articles of various types and shapes in stacked groups particularly in preparation for packaging the individual groups. Each apparatus constructed according to the present invention is capable of handling articles of a variety of shapes and a range of sizes, particularly elongated articles which may be of oval, rectangular or irregular shape in plan view. The invention is therefore useful in the baking industry where cookies of different configuration are produced on different production runs and it is desired to utilize the same equipment for grouping and stacking the output of each production run.

It will be seen from the foregoing that the present invention provides improved article handling, counting, and stacking apparatus capable of operating at high rates of speed in which all essential elements are in continuous motion.

I claim:

1. Article handling apparatus comprising in combination means for delivering a column of articles to a discharge point, a wheel for transporting articles to a conveyor, said wheel having means for holding articles thereto and being positioned with the outer surface thereof at said discharge point, a pick off wheel of smaller diameter than said transporting wheel for removing articles from said delivery means and positioning them on said transporting wheel, means for driving said wheels such that said pick off wheel is rotated in the same direction as said transporting wheel, said pick off wheel being positioned with the axis of rotation thereof passing through said transporting wheel between said discharge point and the axis of rotation of said transporting wheel, said pick off wheel being substantially tangent to said transporting wheel at said discharge point.

2. Apparatus according to claim 1 wherein said transporting and pick off wheels are positioned in side by side relationship.

3. Apparatus according to claim 2 wherein said pick off wheel is rotated faster than said transporting wheel.

4. Apparatus according to claim 2 wherein said article holding means are vacuum ports in the outer surface of said transporting wheel.

5. Apparatus according to claim 3 wherein said pick wheel is formed with a set of spaced teeth arranged in discontinuous manner around its periphery so as to transfer articles to said transporting wheel in clearly defined groups.

6. Apparatus according to claim 5 wherein the second through last tooth is equally spaced from the preceeding tooth and the first tooth is spaced a substantially larger distance from the preceeding last tooth of the set.

7. Apparatus according to claim 3 wherein said transporting wheel is driven by a tubular shaft and has a ring gear mounted thereto, a stationary shaft extends through said tubular shaft, an arm extends from said stationary shaft adjacent said ring gear, said pick off wheel is pivotally mounted on said arm, and a gear mounted to said pick off wheel engages said ring gear to drive said pick off wheel.

8. Apparatus according to claim 7 wherein a pair of transporting wheels are positioned on each side of said pick off wheel and mounted on aligned tubular shafts, a stationary shaft extends through each of said tubular shafts, said inner ends of said stationary shafts being interconnected by a crank member for accomodating said pick off wheel, and a pair of gears mounted to said pick off wheel on a common shaft and engaging each of said ring gears, one of said transporting wheels being driven by its tubular shaft and the other transporting wheel being driven through said ring gears and said gears mounted on said pick off wheel.

9. Apparatus according to claim 1, including a horizontal conveyor extending beneath said transporting wheel to receive a first layer of articles therefrom, a second transporting wheel spaced from said first transporting wheel along said conveyor, a second means for delivering a column of articles to a discharge point adjacent to the outer surface of said second transporting wheel a second pick off wheel for removing articles from said second feed means and depositing them on said second transporting wheel, said second transporting wheel being positioned at least two article thickness above said conveyor and being synchronized with said first transporting wheel to stack a second layer of articles on the first layer of articles.

10. Apparatus according to claim 9 wherein both of said transporting wheels are provided with vacuum ports in their outer surfaces to hold articles thereto, said pick off wheels are formed with a set of spaced teeth arranged in discontinuous manner around their periphery so as to transfer articles to said transporting wheels in clearly defined groups and to form stacks of clearly defined groups of articles upon said conveyor.

11. Article handling apparatus comprising in combination means for delivering a column of articles to a discharge point, a wheel for transporting articles to a conveyor, said wheel having means for holding articles thereto and being positioned with the outer surface thereof adjacent to said discharge point, a pick off wheel of smaller diameter than said transporting wheel for removing articles from said delivery means and depositing them on said transporting wheel, means for driving said wheels such that said pick off wheel is rotated in the same direction as said transporting wheel, said pick off wheel being positioned with the axis of rotation thereof between said discharge point and the axis of rotation of said transporting wheel, a horizontal conveyor extending beneath said transporting wheel to receive a first layer of articles therefrom, a second transporting wheel spaced from said first transporting wheel along said conveyor, a second means for delivering a column of articles from said second feed means and depositing them on said second transporting wheel, said second transporting wheel being positioned at least two article thickness above said conveyor and being synchronized with said first transporting wheel to stack a second layer of articles on the first layer of articles.

12. Apparatus according to claim 11 wherein both of said transporting wheels are provided with vacuum ports in their outer surfaces to hold articles thereto, said pick off wheels are formed with a set of spaced teeth arranged in discontinuous manner around their periphery so as to transfer articles to said transporting wheels in clearly defined groups and to form stacks of clearly defined groups of articles upon said conveyor.

* * * * *